March 20, 1962     G. W. MacARTHUR     3,025,735
LATHE CENTER
Filed Oct. 24, 1958
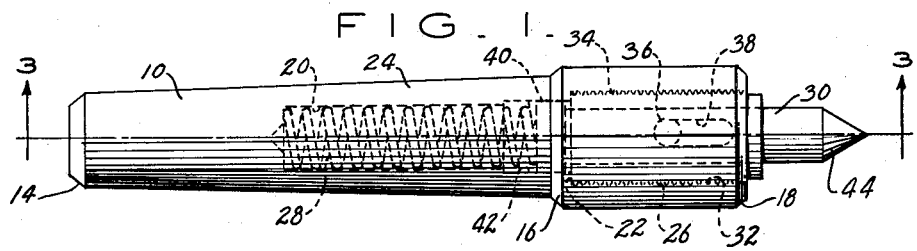
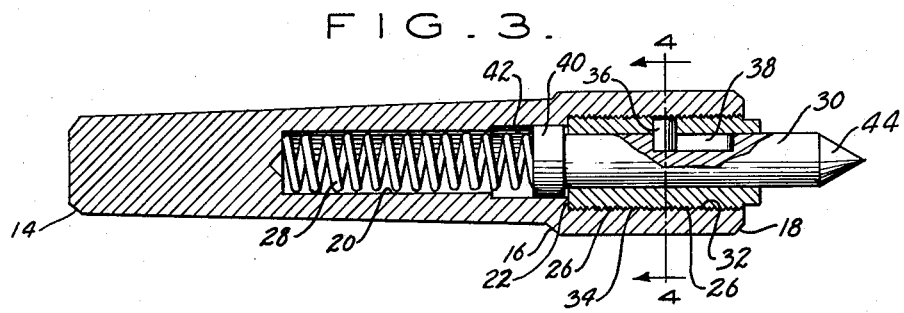
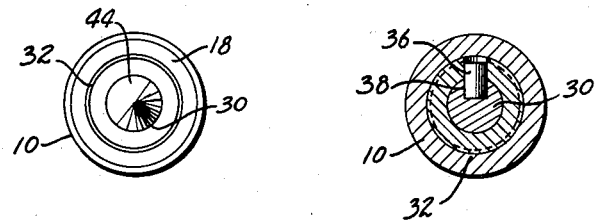
INVENTOR.
GEORGE W. MACARTHUR
BY Whittemore
Hulbert & Belknap
ATTORNEYS United States Patent Office 3,025,735
Patented Mar. 20, 1962

3,025,735
LATHE CENTER
George W. MacArthur, Farmington, Mich.
(20414 Shadyside Ave., Livonia, Mich.)
Filed Oct. 24, 1958, Ser. No. 769,330
1 Claim. (Cl. 82—33)

This invention relates to a lathe center and refers more particularly to a dead tail center for a lathe which automatically compensates for expansion of a work piece during the machining operation.

Tail centers for lathes are subject to a great amount of friction at the surfaces in contact with a work piece held thereby due to the expansion of the work pieces caused by their heating during a machining operation. This friction often generates sufficient heat to burn the point of the center thereby destroying its usefulness. In the past live centers rotating with the work piece have been used to eliminate the friction between the work piece and tail center. The live centers generally are mounted in ball or roller bearings. They are subject to inaccuracies at high pressures due to their inability to move longitudinally with expansion of the work piece. The life of a live center is relatively short due to the moving parts therein and the accuracy requirement in lathe centers. Furthermore live centers are generally complicated and relatively expensive.

Therefore it is one of the essential objects of this invention to provide a dead tail center for a lathe which automatically compensates for expansion of a work piece.

Another object is to provide a tail center for a lathe which compensates for expansion of a work piece wherein movement between the members of the tail center is kept to a minimum.

Another object is to provide a tail center for a lathe which compensates for expansion of a work piece wherein the work holding center element is in contact with a bearing sleeve around the full circumference of the center element for the greatest portion of the length of the center element.

Another object is to provide a tail center for a lathe which compensates for expansion of a work piece wherein a center element is supported in a bearing sleeve for longitudinal movement with respect thereto, the bearing sleeve and center element forming a replaceable unit mounted in a holder, the holder being adapted to be mounted in a lathe tail spindle.

Another object is to provide a tail center which is positively restrained from rotary motion and moves longitudinally in response to pressure applied thereto due to expansion of a work piece held thereby.

Another object is to provide a tail center which compensates for expansion of a work piece, said tail center being simple in construction, easy to manufacture and efficient in use.

Other objects and features of the invention will become apparent as the description proceeds, especially when taken in conjunction with the accompanying drawings, illustrating a preferred embodiment of the invention, wherein:

FIGURE 1 is a top view of a lathe center according to the invention.

FIGURE 2 is a view of the right hand end of the lathe center of FIGURE 1.

FIGURE 3 is a longitudinal section of the tail center of FIGURE 1 taken on line 3—3 in FIGURE 1.

FIGURE 4 is a cross section of the tail center of FIGURE 1 taken on line 4—4 in FIGURE 3.

The embodiment of the invention illustrated in the drawings includes a holder with a recess in one end thereof, a spring positioned within said recess and a center element mounted in a bearing sleeve. The bearing sleeve is screwed into said recess causing the spring to bias the center element in a direction to move the center element and sleeve out of the recess. As illustrated the center element is supported for most of the length thereof by the bearing sleeve for longitudinal movement with respect thereto. The bearing sleeve and center element are movable and replaceable as a single unit.

The holder 10 is an elongated circular member which is tapered so that the diameter of end 14 is slightly less than the diameter at shoulder 16. The taper is provided to facilitate the grasping of holder 10 by a lathe tail spindle (not shown). At 16 the diameter of holder 10 increases sharply and remains constant between 16 and end 18. A recess 20 is formed in end 18 of holder 10. The recess 20 is provided with two annular abutments 22 and 24 on the interior thereof. The interior of recess 20 between abutment 22 and end 18 is provided with threads 26.

A compression spring 28 of the coil type is inserted in recess 20 as shown. Spring 28 is provided so that in operation center element 30 will be pressed onto a work piece (not shown). Spring 28 also provides automatic adjustment of the longitudinal position of center element 30 should the work piece overheat and expand exerting longitudinal pressure on center element 30.

A bearing sleeve 32 is provided in the form of a hollow cylinder as indicated. Sleeve 32 has threads 34 on the exterior thereof. Threads 34 and threads 26 on the interior of recess 20 are machined to very close tolerance so that when sleeve 32 is screwed into recess 20 as shown the sleeve is centered axially with respect to holder 10.

Center element 30 is inserted in bearing sleeve 32 before sleeve 32 is screwed into holder 10. Center element 30 and the interior bearing surface of sleeve 32 are also produced to very close tolerance so that when the center element is inserted in the sleeve the element is centered axially with respect to the holder 10. As illustrated the bearing sleeve 32 and center element 30 are of such dimensions that the element is in contact with the bearing sleeve over substantially the total surface thereof for the greater portion of the length of the center element. This large bearing surface prevents excessive wear between the center element 30 and bearing sleeve 32 and eliminates inaccuracies of alignment produced by longitudinal pressure on center element supported by point or line contact ball or roller bearings.

Pin 36 is provided in conjunction with sleeve 32 as shown. Pin 36 extends through the wall of sleeve 32 and projects into a slot 38 in the side of center element 30. Pin 36 prevents rotation of center element 30 with a work piece but allows longitudinal adjustment of center pin 30 in sleeve 32 to compensate for the expansion of a work piece due to heat generated by machining.

As illustrated end 40 of center pin 30 is larger in diameter than the remainder of the center pin. The enlarged end on center pin 30 provides a surface against which compression spring 28 may act. The shoulder 42 provided by the end of sleeve 32 acts as a stop to limit the biasing action of spring 28 on center pin 30.

In use the tapered end of the holder is inserted in a lathe tail spindle, a work piece is centered in the lathe on center pin 30 and the machining operation is started. As the work piece expands due to the heat generated by the machining operation, longitudinal pressure is exerted on the point 44 of center pin 30. In response to such pressure pin 30 adjusts position longitudinally automatically against the bias of spring 28.

With the lathe center as described and illustrated the danger of burning the center point because of binding of the point and work piece due to longitudinal pressure exerted therebetween by an expanding work piece is eliminated. Also, since the center is essentially a dead center with no rotary movement and since the center is supported over its entire surface in a bearing sleeve for most of its length, it is subject to little wear and consequent alignment inaccuracies. Furthermore, according to the invention bearing sleeve 32 and center element 30 are easily removable and replaceable as a separate unit in holder 10.

The drawings and the foregoing specification constitute a description of the improved "lathe center" in such full, clear, concise and exact terms as to enable any person skilled in the art to practice the invention, the scope of which is indicated by the appended claim.

What I claim as my invention is:

A dead tail center construction wherein the center element is prevented from rotating with a workpiece and is supported for axial movement with respect to the workpiece to permit expansion of the workpiece due to heating without burning of the center element, comprising an elongated holder having a cylindrical recess extending into one end thereof, said recess having an inner portion, a central portion and an outer portion separated by radially extending annular abutments and of progressively larger diameter outward of said recess, a bearing sleeve and center element assembly secured within the outer portion of said recess for removal and replacement as a unit, said assembly including a bearing sleeve having an internal diameter less than the diameter of the central portion of said recess removably secured in the outer portion of said recess with the inner end thereof located against the annular abutment separating the central and outer portions of said recess, a center element having a cylindrical shank slidably received in said sleeve, the shank of said center element having an enlarged head at its inner end engageable with the inner end of said sleeve and the annular abutment separating the inner portion of said recess from the central portion thereof which constitute locating abutments for said center element with respect to movement thereof outwardly and inwardly of said recess respectively, the cylindrical shank of said center element protruding axially outwardly of said sleeve a distance greater than the length of the central portion of said recess less the axial dimension of the head of the center element and terminating in a tapered end axially outwardly of said shank, and pin and slot means included entirely within said center element and sleeve and acting therebetween to prevent separation between a matched sleeve and center element sub-assembly and to prevent relative rotation between the sleeve and center element of said assembly and allow relative axial movement therebetween, and a compression spring in the inner portion of said recess acting between the inner end of the recess and the enlarged head of the center element for biasing the enlarged head of the center element into engagement with the inner end of said sleeve.

References Cited in the file of this patent

UNITED STATES PATENTS

| | | |
|---|---|---|
| 979,034 | Rowe | Dec. 20, 1910 |
| 1,285,350 | Palmgren | Nov. 19, 1918 |
| 2,093,009 | Galbraith | Sept. 14, 1937 |
| 2,333,055 | Terrell | Oct. 26, 1943 |
| 2,463,385 | Holohan | Mar. 1, 1949 |
| 2,536,687 | Janson | Jan. 2, 1951 |

FOREIGN PATENTS

| | | |
|---|---|---|
| 248,547 | Switzerland | May 15, 1947 |
| 910,855 | France | Feb. 18, 1946 |